(12) United States Patent
Chen et al.

(10) Patent No.: US 12,454,004 B2
(45) Date of Patent: *Oct. 28, 2025

(54) REAL-TIME MOLTEN DROPLET ANALYZER WITH SPATIAL MODULATION IN ADDITIVE MANUFACTURING

(71) Applicant: Xerox Corporation, Norwalk, CT (US)

(72) Inventors: Qiushu Chen, San Bruno, CA (US); Peter Kiesel, Palo Alto, CA (US); Dogan Timucin, Santa Cruz, CA (US)

(73) Assignee: Xerox Corporation, Norwalk, CT (US)

( * ) Notice: Subject to any disclaimer, the term of this patent is extended or adjusted under 35 U.S.C. 154(b) by 511 days.

This patent is subject to a terminal disclaimer.

(21) Appl. No.: 17/984,113

(22) Filed: Nov. 9, 2022

(65) Prior Publication Data
US 2024/0149349 A1    May 9, 2024

(51) Int. Cl.
*B22F 10/34* (2021.01)
*B22F 10/22* (2021.01)
(Continued)

(52) U.S. Cl.
CPC .............. *B22F 10/34* (2021.01); *B22F 10/22* (2021.01); *B22F 10/85* (2021.01); *B22F 12/50* (2021.01);
(Continued)

(58) Field of Classification Search
CPC .......... B22F 10/34; B22F 10/22; B22F 10/85; B22F 12/50; B22F 12/90; B22F 10/38;
(Continued)

(56) References Cited

U.S. PATENT DOCUMENTS 9,114,606 B1   8/2015  Ready et al.
12,121,971 B2 * 10/2024  Chen .................. H04N 1/00015
(Continued)

FOREIGN PATENT DOCUMENTS

CN      115255393 A    11/2022
EP       3580042 A    12/2019
(Continued)

OTHER PUBLICATIONS

EP Search Report for EP Application No. 23203920.6-1103, dated Mar. 15, 2024, 16 pages.
(Continued)

*Primary Examiner* — Michael J Brown
(74) *Attorney, Agent, or Firm* — Womble Bond Dickinson (US) LLP

(57) ABSTRACT

Techniques for determining characteristics of a stream of jetted material in a three-dimensional (3D) printer are disclosed. An example system includes an ejector configured to release molten droplets along a jetting path from the ejector to a build platform. The system also includes a sensor positioned adjacent to the jetting path and configured to generate an electrical signal in response to light emanating from the molten droplets. The system also includes an optical mask positioned adjacent to the jetting path, the optical mask comprising a plurality of regions configured to modulate the electrical signal generated by the sensor as the molten droplets travel along the jetting path. The system also includes one or more processing devices to receive the electrical signal, analyze the electrical signal to identify one or more characteristics of the molten droplets, and control the 3D printer based on the one or more characteristics.

20 Claims, 15 Drawing Sheets

(51) Int. Cl.
  *B22F 10/85* (2021.01)
  *B22F 12/50* (2021.01)
  *B22F 12/90* (2021.01)
  *B33Y 10/00* (2015.01)
  *B33Y 30/00* (2015.01)
  *B33Y 50/02* (2015.01)
  *B22F 10/38* (2021.01)

(52) U.S. Cl.
  CPC .............. *B22F 12/90* (2021.01); *B33Y 10/00* (2014.12); *B33Y 30/00* (2014.12); *B33Y 50/02* (2014.12)

(58) Field of Classification Search
  CPC ..... B22F 2999/00; B33Y 10/00; B33Y 30/00; B33Y 50/02
  USPC .......................................... 700/119
  See application file for complete search history.

(56) References Cited

U.S. PATENT DOCUMENTS

| | | |
|---|---|---|
| 2014/0098156 A1 | 4/2014 | Taff et al. |
| 2018/0011475 A1 | 1/2018 | Donovan et al. |
| 2018/0191967 A1 | 7/2018 | Kester |
| 2018/0370142 A1 | 12/2018 | Martin et al. |
| 2021/0197487 A1* | 7/2021 | Ge .................. B22F 12/53 |
| 2021/0379664 A1 | 12/2021 | Gibson et al. |
| 2022/0176630 A1 | 6/2022 | Maeda et al. |
| 2022/0324226 A1 | 10/2022 | Dafiniou et al. |

FOREIGN PATENT DOCUMENTS

| | | |
|---|---|---|
| EP | 4011527 A1 | 6/2022 |
| WO | 2018194680 A1 | 10/2018 |

OTHER PUBLICATIONS

EP Search Report for EP Application No. 23203920.6-1103, dated Jul. 22, 2024, 16 pages.

* cited by examiner

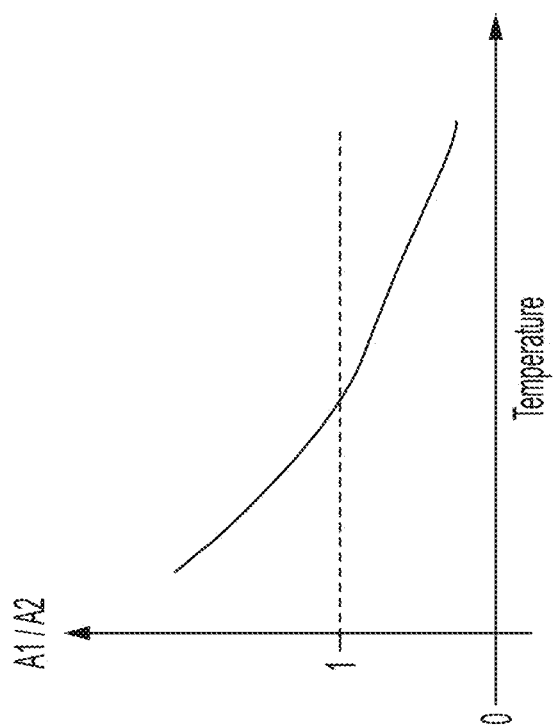

REAL-TIME MOLTEN DROPLET ANALYZER WITH SPATIAL MODULATION IN ADDITIVE MANUFACTURING

TECHNICAL FIELD

Implementations of the present disclosure relate to techniques for determining the jetting quality in additive manufacturing and techniques for use in same.

BACKGROUND

Additive manufacturing (often known as 3D printing) enables production of structures that optimize strength to weight ratios. For example, hollow structures that are expensive or difficult to achieve in machining processes (i.e., removal of materials by cutting) may be created layer by layer in additive manufacturing. Many forms of additive manufacturing make use of transforming matter from one state to another, such as from liquid to solid, by chemical reactions or by heat (e.g., melting materials at specific locations and solidifying when cooled). Liquid metal jetting (LMJ) is a type of 3D printing technology that uses molten metal as the printing material.

One particular type of LMJ printer is a magnetohydrodynamic (MEM) printer, which is suitable for depositing liquid metal layer upon layer to form a 3D metallic object. In a MHD printer, an electrical current through a metal coil produces time-varying magnetic fields that induce eddy currents within a reservoir of liquid metal compositions. Coupling between magnetic and electric fields within the liquid metal results in Lorentz forces that cause droplets of the liquid metal to be ejected (also referred to as jetted) through a nozzle of the printer. The nozzle may be controlled to select the size and shape of the droplets. The build platform can be controlled so that the droplets land on the substrate in a controlled manner to build the 3D object.

In the LMJ printing process, the quality of the jetted liquid metal droplets is influenced by many factors and can fluctuate significantly during the printing process. Inconsistent low-quality droplet jetting can result in undesired printing results. For example, if the droplet deposition becomes erratic, the 3D printed part may deviate significantly from its intended form. Poor droplet quality can also be a prelude to catastrophic failure of the printer.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments. Like numerals indicate like elements

FIG. 11 is an example graph of the ratio of peak amplitudes versus temperature.

DETAILED DESCRIPTION

Figure 1:
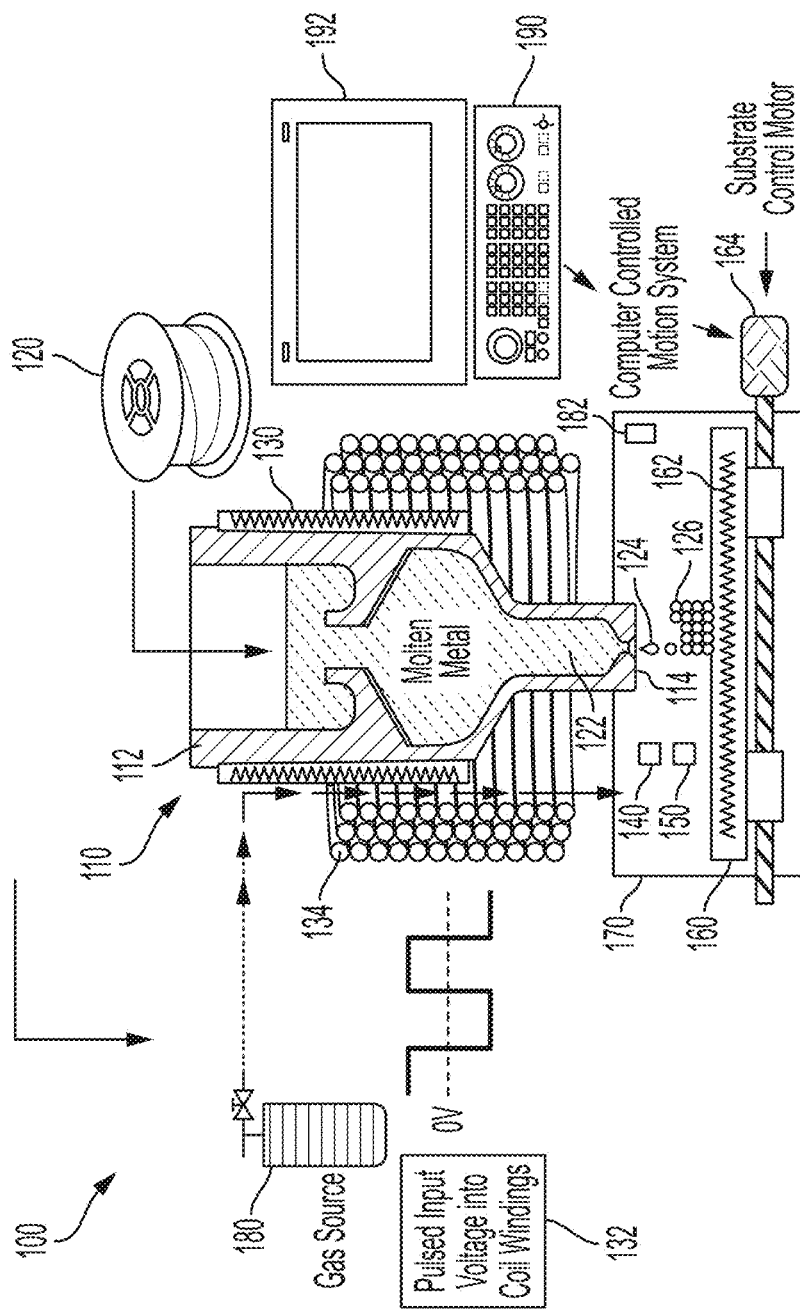
FIG. 1 depicts a schematic cross-sectional view of a 3D printer, in accordance with some embodiments of the present disclosure.

Aspects of the present disclosure provides various techniques for determining the printing quality of a 3D printer. More specifically, the present disclosure discloses techniques for in-situ real-time diagnostics of the metal droplets during an LMJ build process to ensure the quality and reliability of the build. In liquid metal jetting, a molten metal is ejected from a nozzle and deposited onto a substrate. In such techniques, a single molten droplet deposited on a solid of the same material serves as the basic building block for fabrication by precise, dropwise deposition.

To ensure quality 3D printing, the stream of droplets should be consistent and predictable. The quality of the printing process may be compromised if the stream of droplets becomes irregular, for example, if the droplets deviate from a jetting path, break into smaller fragments, have inconsistent shapes or sizes, or inconsistent ejection speed or frequency. Various conditions of the 3D printer could cause such inconsistencies, such as fouling of the print nozzle, for example.

In some systems, the quality of the printing process can be evaluated by capturing images of the stream of jetted material using high speed cameras. However, in addition to being very expensive, such cameras produce a large amount of data. Accordingly, processing such images in real time may require a large amount of time and/or processing resources and may not always be suitable for providing diagnostic information in a timely manner. For these reasons, camera-based monitoring systems are costly and difficult to implement in a closed-loop print control monitoring for LMJ.

The droplet detection techniques disclosed herein use spatial light modulation, a cost effective, high-speed approach for analyzing and characterizing moving particles. In spatial light modulation, light emanating from the droplets (or passing between the droplets) in the stream of jetted material can be detected by a photodetector and converted to a time-varying electrical signal. The light pattern generated by the droplets is manipulated by interposing an optical filter, also referred to herein as an optical mask, between the stream of droplets and the photodetector or between stream of droplets and an external light source used to illuminate the droplets. The optical mask includes a pattern of transparent and opaque regions that effect the manner in which the light from the droplets reaches the optical detector. In this way, the optical mask determines how information about the droplets is encoded in the electrical signal by effecting the modulation of the light over time as droplets move relative to the optical mask. The layout of the optical masks may be configured according to the type of information to be encoded into the modulation of the electrical signal.

The resulting electrical signals can be processed using feature extraction algorithms that extract features of the signal to identify characteristics of the stream of jetted material given the known design of the optical mask. Characteristics of the stream that may be identified include droplet size, droplet speed, ejection frequency, droplet shape, droplet location, droplet trajectory, droplet shape oscillation, droplet temperature, oxidation state of the droplets, uniformity of the droplets, and others.

Droplet features can be extracted using various algorithms, including FFT, correlation, etc. In addition, a labeled data set can be established by collecting data using the spatial modulation system and a high-speed camera or other droplet characterization system at the same time. This can not only be used for system calibration, but also make it possible to use machine learning for droplet diagnostics. A machine learning model (e.g., neural network) can be trained based on the labeled data set for future real-time droplet diagnostics. This can open larger detectable parameter space by the spatial modulation technique while maintaining the merit of having light-weight sensor data stream.

In accordance with embodiments, the detected signal can be provided to a diagnostic software tool that can automatically process the signal to extract features from the signal to determine characteristics of the stream of jetted material and thus the quality of the printing process. The diagnostic process described herein may be performed continuously throughout the performance of a print job to ensure continued 3D print quality. The extracted features may be used to control the 3D printer to adjust the stream of jetted material or to discontinue the printing process if characteristics of the stream of jetted material indicate poor printing quality.

The system described herein can be implemented using a photodetector detector with one or a few pixels instead of a camera that generates a high pixel-count image. In this way, the system generates a high-speed, light-weight data stream that is suitable for real-time processing and feedback control. This enables the diagnostic software tool to quickly and accurately identify droplet characteristics and determine the quality of the print setup in real-time while a print job is being processed. The fast availability of diagnostic information can enable various features for controlling the printing process based on feedback about droplet quality.

Additionally, the fact that a photodetector is used in the detection system as opposed to a camera opens a broader spectral range for real-time monitoring. In some embodiments, the light emanating from the droplets is light that originates from a light source and is scattered, reflected, or diffracted from the droplets. In some embodiments, the thermal emission from the hot metal droplet can be used as a signal source, eliminating the need for an additional light source. This can significantly simplify the system design and make it easier to integrate into the printer. Additionally, in some embodiments, the diagnostic system may be configured to optionally operate with or without a light source. For example, the system may be configured to be capable of operating in both an "active" mode, in which an illumination system shines light onto the droplet and then the reflected/diffracted/scattered light gets collected, or a "passive" mode, in which the thermal emission from the molten droplet is utilized as the signal source and the additional light source can be deactivated.

FIG. 1 depicts a schematic cross-sectional view of a 3D printer 100, in accordance with some embodiments of the present disclosure. The 3D printer 100 may include an ejector 110 (also referred to as a pump chamber). The ejector 110 may define an inner volume that is configured to receive a printing material 120. The printing material 120 may be or include a metal, a polymer (e.g., a photopolymer), or the like. For example, the printing material 120 may be or include aluminum (e.g., a spool of aluminum wire).

The 3D printer 100 may also include one or more heating elements 130. The heating elements 130 are configured to melt the printing material 120 within the inner volume of the ejector 110, thereby converting the printing material 120 from a solid material to a liquid material (e.g., liquid metal) 122 within the inner volume of the ejector 110.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorenz force. The Lorenz force creates a pressure at an inlet of a nozzle 114 of the ejector 110. The pressure causes the liquid metal 122 to be jetted through the nozzle 114 in the form of one or more droplets 124.

The 3D printer 100 may also include one or more photodetectors (one is shown: 140) that is/are configured to generate an electrical signal from light emanating from the droplets 124 or passing between the droplets 124. The 3D printer 100 may also include one or more light sources (one is shown: 150) that is/are configured to shine light on the nozzle 114, the droplets 124, or both. The light source 150 may be or include a fiber optic light source, an LED light source, and others. The light source 150 may be or include a collimated light source. The light source 150 may be or include a white light source. The light emanating from the droplets due to the light source 150 may be detected by the photodetector 140 for the generation of the electrical signal. In other embodiments, the light emanating from the light droplets may be generated by the droplets themselves, for example, infrared light generated by the heat of the droplets. The 3D printer 100 may also include one or more optical masks (not shown in FIG. 1). The optical masks serve as optical filters that modulate the light emanating from the droplets to encode information into the electrical signal that can be analyzed to reveal various characteristics of the droplets. In some embodiments, droplet monitoring may be triggered by the 3D printer 100 as a normal checkup, by operator intervention, detection of irregular jetting, and/or by detection of greater than usual deviations of the 3D printer 100. Droplet monitoring may also be performed continuously through the duration of an entire print job.

The 3D printer 100 may also include a substrate 160 (also referred to as a build plate or build platform) that is positioned below the nozzle 114. The droplets 124 that are jetted through the nozzle 114 may land on the substrate 160 and cool and solidify to produce a 3D object 126. The substrate 160 may include a heater 162 therein that is configured to increase the temperate of the substrate 160. The 3D printer 100 may also include a substrate control motor 164 that is configured to move the substrate 160 as the droplets 124 are being jetted (i.e., during the printing process) to cause the 3D object 126 to have the desired shape and size. The substrate control motor 164 may be configured to move the substrate 160 in one dimension (e.g., along an X axis), in two dimensions (e.g., along the X axis and a Y axis), or in three dimensions (e.g., along the X axis, the Y axis, and a Z axis). In another embodiment, the ejector 110 and/or the nozzle 114 may be also or instead configured to move in one, two, or three dimensions.

In one embodiment, the 3D printer 100 may also include an enclosure 170. The enclosure 170 may be positioned at least partially around the ejector 110, the nozzle 114, the droplets 124, the 3D object 126, the heating elements 130, the coils 134, the substrate 160, or a combination thereof. In some embodiments, the enclosure 170 may also include the photodetector 140 and/or the light source 150. However, the photodetector 140 and/or the light source 150 may also be disposed outside of the enclosure. In one embodiment, the enclosure 170 may be hermetically sealed. In another embodiment, the enclosure 170 may not be hermetically sealed. In other words, the enclosure 170 may have one or more openings that may allow gas to flow therethrough. For example, the gas may flow out of the enclosure 170 through the openings.

In one embodiment, the 3D printer 100 may also include one or more gas sources (one is shown: 180). The gas source 180 may be positioned outside of the enclosure 170 and configured to introduce gas into the enclosure 170. The gas source 180 may be configured to introduce a gas that flows (e.g., downward) around the ejector 110, the nozzle 114, the heating elements 130, or a combination thereof. The gas may flow around and/or within the coils 134. The gas may flow into the enclosure 170 and/or proximate to (e.g., around) the droplets 124, the 3D object 126, and/or the substrate 160.

The 3D printer 100 may also include a gas sensor 182. The gas sensor 182 may be positioned within the enclosure 170. The gas sensor 182 may also or instead be positioned proximate to the droplets 124, the 3D object 126, and/or the substrate 160 (e.g., in an embodiment where the enclosure 170 is omitted). The gas sensor 182 may be configured to measure a concentration of the gas, oxygen, or a combination thereof.

The 3D printer 100 may also include a computing system 190. The computing system 190 may be configured to control the introduction of the printing material 120 into the ejector 110, the heating elements 130, the power source 132, the photodetector 140, the light source 150, the substrate control motor 164, the gas source 180, the gas sensor 182, or a combination thereof. For example, the computing system 190 may be configured to receive the signals from the photodetector 140 and to characterize the behavior of the droplets 124 that are ejected from the nozzle. The computing system 190 may also be configured to adjust one or more parameters of the 3D printer 100 based at least partially upon the behavior of the droplets. For example, the temperature of the molten metal may be increased or decreased depending on the monitored droplet characteristics such as droplet temperature, droplet size, or ejection frequency, for example. Additionally, the computing system 190 may be configured to automatically interrupt a print job if the detected droplet characteristics indicate poor jetting quality. The computing system 190 may include a display screen 192 that can be used to display information about the 3D printing system to an operator. The display screen 192 may display information about the detected droplet characteristics and can also be used to alert an operator of unfavorable printing conditions and/or suggest corrective measures. The monitoring of the ejected droplets may be part of a real-time closed loop control system provided by the computing system 190 and implemented by diagnostic software.

Figure 2:
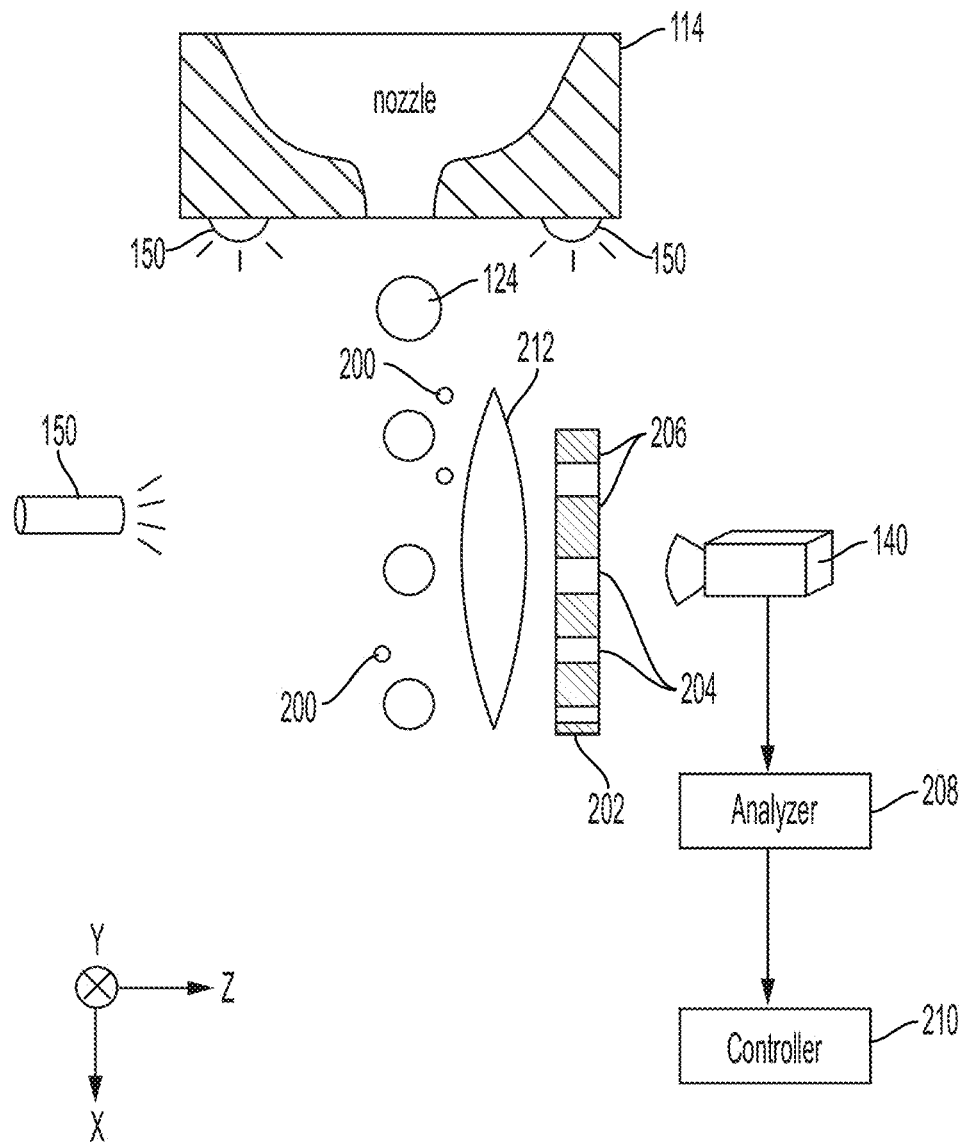
FIG. 2 depicts a side view of a portion of FIG. 1, in accordance with embodiments of the present disclosure.

FIG. 2 is a side view of a portion of the 3D printer 100 and depicts a system for determining droplet characteristics based on spatially modulated light, in accordance with some embodiments of the present disclosure. More particularly, FIG. 2 depicts a side view of the nozzle 114, the photodetector 140, and the light source 150. The photodetector 140 and the light source 150 may be directed toward at least a portion of the stream of jetted material. In FIG. 2, four droplets 124 of the liquid printing material 120 are shown. The droplets 124 have been jetted from the nozzle 114 and are descending toward the substrate 160 (not shown in FIG. 2). In addition to the droplets 124, there are additional fragments of the liquid printing material 120, which may be referred to herein as satellites 200. The satellites 200 are smaller fragments of ejected material, which may be liquid or solid, and may travel in an undesired trajectory. Satellites are undesirable because they tend to be deposited in an uncontrolled manner that negatively affects the shape and mechanical properties of the printed part. The droplets, satellites, and other fragments of jetted material may be referred to herein as droplets.

Components of the assembly are arranged in a coordinate system that includes a longitudinal axis, designated as the X-axis herein, a lateral axis, designated as the Y-axis, and a depth axis, designated as the Z-axis. In the description below, the jetting direction, i.e., the direction in which the droplets generally travel, is selected to lie generally along the longitudinal axis (X-Axis) of the coordinate system, and the longitudinal, lateral, and depth axes are orthogonal to one another. It will be appreciated that any coordinate system could alternatively be selected, the arrangement of the assembly with respect to the coordinate system is arbitrary and does not change the operation of the assembly, and that non-orthogonal axis systems could alternatively be used. The droplets of jetted material may move generally in the positive X-direction illustrated. However, as discussed subsequently, some droplets may additionally or alternatively move along the detection region in the y-direction and/or z-direction illustrated.

In some cases, the light source 312 may comprise a conventional laser, a laser diode (LD), light emitting diode (LED) source, or a resonant cavity LED (RC-LED) source, for example. In some embodiments, the light source may incorporate one or more filters to narrow or otherwise tailor the spectrum of the resultant output light. Whichever type of light source is selected, the spectral makeup or composition of the incoming light emitted by the light source 312 is preferably tailored to excite, scatter, or otherwise cause emanation of light from at least some of the droplets that may be present in the sample, as discussed further below.

Also shown in FIG. 2 is an optical mask 202, which includes alternating regions of increased and decreased light transmission. The regions of increased and decreased light transmission may be referred to herein as light-passing regions and light-blocking regions. The optical mask may be made of any suitable material or combination of materials, including metals, plastics, glass, ceramics, and others. The clear portions may be formed using a clear material such as glass or clear plastics. The clear portions may also be due to an absence of material. For example, optical mask may be a solid sheet of aluminum or other metal with slots that form the transparent regions.

In the embodiment shown in FIG. 2, the optical mask 202 is disposed between the stream of jetted material and the photodetector 140. In this position, the optical mask 202 may be referred to as an output mask. In other configurations, the optical mask can be disposed between the light source 150 and the stream of jetted material, in which case, the optical mask 202 may be referred to as an input mask. An input mask may be adapted to transmit light emitted by the light source by varying amounts to create a patterned excitation light that illuminates the stream of jetted material depending on its location along the jetting direction (X-axis). The techniques described herein will generally be described in reference to one or more output masks. However, it will be appreciated that many of the same techniques may also be applied in a system that uses input masks.

The optical mask shown in FIG. 2 includes a pattern of first regions 204 that are more light transmissive and second regions 206 that are less light transmissive or completely block light. In some embodiments, the first regions 204 may be transparent or nearly transparent, while the less transmissive regions 206 may be opaque or nearly opaque. Additionally, color responsive optical masks may be used such that some regions of the optical mask 202 are more transmissive to a first wavelength band and less transmissive to a second wavelength band while other regions of the optical mask 202 are less transmissive to the first wavelength band and is more transmissive to the second wavelength band. The system 100 may also include one or more lenses 212 to focus light from the droplets onto the optical mask 202.

As the ejected droplets travel from the nozzle 114 toward the build platform adjacent to the optical mask 202, the more transmissive and less transmissive regions of the optical mask 202 alternatively transmit and block light, creating time modulated light that falls on the photodetector 140. The light may be modulated by the optical mask 202 in combination with either the light emanating from the droplets or due to the droplets blocking the light from the light source 150. In response to the time varying light, the photodetector 140 generates a time varying electrical signal.

The time variation in the light detected by the photodetector 140 may be the result of interactions between the optical mask 202 and light emanating from the droplets 124 and/or satellites 200. For example, as the droplets of jetted material (e.g., droplets 124, satellites 200, etc.) travel in the jetting direction (X-axis), light emanating from the droplets is alternately substantially transmitted or substantially blocked from reaching the photodetector as the droplet travels along the jetting path. The alternate transmission and non-transmission (or reduced transmission) of the emitted light produces the time-varying light detected by the photodetector 140. In response, the photodetector 140 generates a time-varying electrical output signal.

Also shown in FIG. 2 is an analyzer 208 and a controller 210. The analyzer 208 and controller 210 may be components of the computing system 190 and may be implemented in hardware or a combination of hardware and software. For example, the analyzer 208 may include one or more signal conditioners, analog-to-digital converters (ADC), processing devices, computer memory, and the like. The time-varying electrical signal may be provided to an analyzer 208. The analyzer 208 may also convert the time-varying electrical signal from a time domain signal to a frequency domain signal. For converting to the frequency domain, the analyzer 208 may use techniques such as discrete Fourier transform including, for example, a Fast Fourier Transform (FFT) algorithm. The frequency domain signal represents the frequency component magnitude of the time-varying electrical signal generated by the photodetector 140 where the frequency component magnitude is the amount of a given frequency component that is present in the time-varying electrical signal. Other techniques of representing the frequency component magnitude may also be used, such as the square root of the Fourier signal power, or the signal strength (e.g. as measured in voltage or current) obtained from a filter that receives as input the time-varying electrical signal from the photodetector 140. It will be appreciated that the electrical signal may include multiple frequency components, each of which may relate to different features of the stream of jetted material. For example, a first frequency component may represent a first set of droplets being ejected at a first speed, and a second frequency components could represent a second set of droplets or satellites being ejected at a second speed above or below the first speed.

The analyzer 208 is configured to analyze the time-varying electrical signal and/or the frequency domain signal to determine one or more characteristics of the droplets, such as droplet size, shape, trajectory, speed, and the like. The analyzer 208 may be coupled to a controller 210. Information about the droplet characteristics may be sent from the analyzer 208 to the controller 210 and used by the controller to control the 3D printer 100. For example, the controller 210 can be configured to vary one or more of the characteristics of the droplet based upon the characteristics identified by the analyzer 208. For example, the controller 210 may be configured to adjust the voltage profile of the voltage pulses provided from the power source 132 to the coils 134 (FIG. 1) to control one or more characteristics of the droplets, such as the speed, size, temperature, or ejection frequency.

In some embodiments, the controller may adjust a display 192 of the 3D printer based on the droplet characteristic information received from the analyzer 208. For example, the display 192 may be used to indicate characteristics of the droplets and whether the droplet characteristics are within prescribed limits. The information may be displayed to an operator of the 3D printer, which the operator may use to make manual adjustments to the 3D printing process or terminate the print job, for example. In some examples, the controller 210 may auto automatically terminate a print job based on the droplet characteristic information received from the analyzer 208. For example, if the droplet characteristics fall outside of a specified threshold, this may indicate poor print quality and can trigger automatic termination of the print job, resulting in the savings of time and material costs.

For the sake of simplicity, FIG. 2 shows a single light source 150 and a single photodetector 140 associated with a single optical mask 202. However, embodiments of the present techniques may include a plurality of light sources 150, photodetectors 140, and optical masks depending on the design details of a particular implementation.

The orientations of the optical masks, patterning of the optical masks, and composition of the optical masks may vary depending on the information to be encoded within the electrical signals. In some embodiments, the 3D printer may include two or more optical masks each associated with a different photodetector and each configured to encode different information. For example, one optical mask may be configured to encode droplet size information, while another optical mask may be configured to encode position information. In another embodiment, a single optical mask can be configured to encode both size and position information, while a second optical mask may be configured to encode droplet temperature information. In embodiments with more than one optical mask, the optical masks may be oriented in series (i.e., same Y-Z coordinates but different positions along the X-direction) or in parallel (i.e., different Y-Z coordinates but the same position along the X-direction). Various embodiments are described further below.

In some embodiments, the light emanating from the droplets is generated by the droplets themselves, in which case the light source may not be needed. For example, the light may be infrared light generated based on the temperature of the droplets. In such embodiments, the corresponding photodetector 140 is configured to detect the infrared light from the droplets and the first and second regions 204 206 of the optical mask may be configured to have different infrared transmission characteristics.

The optical mask 202 may be configured to be easily removable and replaceable. For example, the 3D printer 100 may have slots, grooves, or other connection mechanism that enables the optical masks to be removably coupled to the 3D printer 100 in one or more predetermined positions. In this way, the optical mask 202 can be swapped out to customize the particular information that the user wants to encode into the signal. The diagnostic software used to analyze the signal can be adjusted according to the type of optical mask 202 loaded into the 3D printer 100. This also enables the user to replace optical masks if they become fouled by stray printing material.

Figure 3:
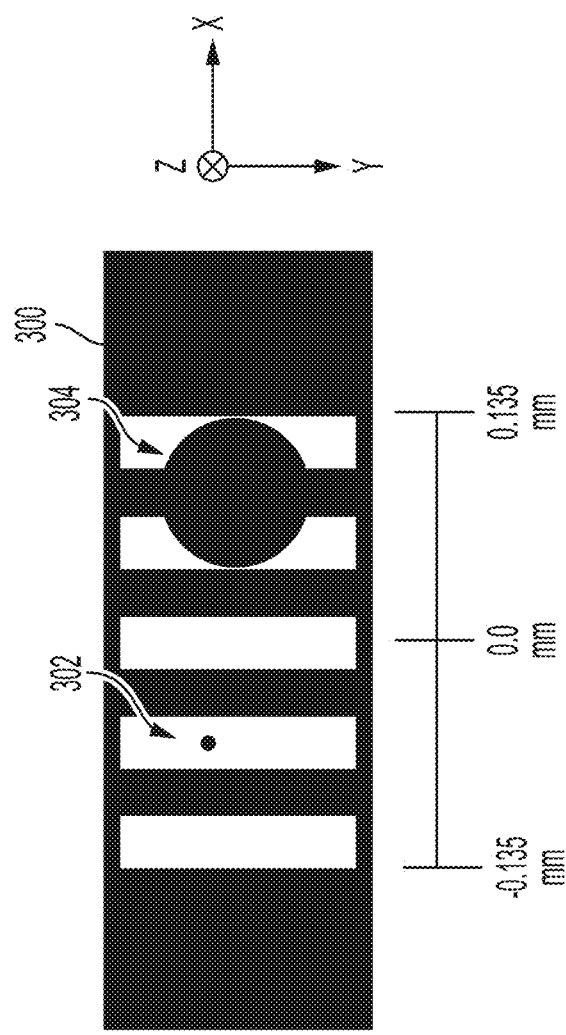
FIG. 3 is an example optical mask in accordance with some embodiments of the present disclosure.

FIG. 3 is an example optical mask 300 in accordance with some embodiments of the present disclosure. The optical mask 300 includes alternating opaque regions and transparent regions arranged along the jetting direction (X-axis). In the example shown in FIG. 3, which has a mask pitch size of 0.03 mm, the length of each transparent section (along the X-axis) is approximately 0.03 mm, the length of each opaque section is also approximately 0.03 mm. The system in this example also includes an optical system (e.g., lens) that provides optical magnification of 1/10 so that droplet images projected onto the mask 300 will be one tenth the actual size of the droplet. It will be appreciated that these dimensions are only examples, and that an optical mask in accordance with embodiments of the present techniques can have any suitable number, size, or arrangement of regions. It is also not a limitation of the present disclosure that the lengths of the transparent regions or opaque regions to be uniform. In some embodiments, the optical mask may include regions that have irregular length, spacing, etc.

Also shown in FIG. 3 are a pair of droplets, referred to herein as the first droplet 302 and second droplet 304. The droplets 302 and 304 are moving behind the optical mask along the jetting axis from the nozzle to the build platform. In this example, the first droplet is approximately 0.1 mm in diameter (for a projected image size of 0.01 on the mask), and the second droplet is approximately 0.9 mm in diameter (for a projected image size of 0.09 on the mask). Additionally, the system is configured so that the photodetector detects light emanating from the droplets. The light may be reflected or refracted or scattered light originating from an external light source or may be light generated by the droplet itself (i.e., infrared light). However, it will be appreciated that a system in accordance with embodiments could also be configured to detect light received from a light source positioned behind the droplets such that the received signal would be modulated according to the degree that the droplets block the light from the light source.

The optical mask shown in FIG. 3 can be used to detect droplet size and travel speed. Regarding travel speed, it will be appreciated that as the droplets pass behind regions of differing transparency, the amplitude of the signal will rise and fall accordingly. The faster the droplet moves, the faster the signal will be amplitude modulated. Accordingly, the frequency of the modulation can be used to detect the travel speed of the droplets.

Figure 4:
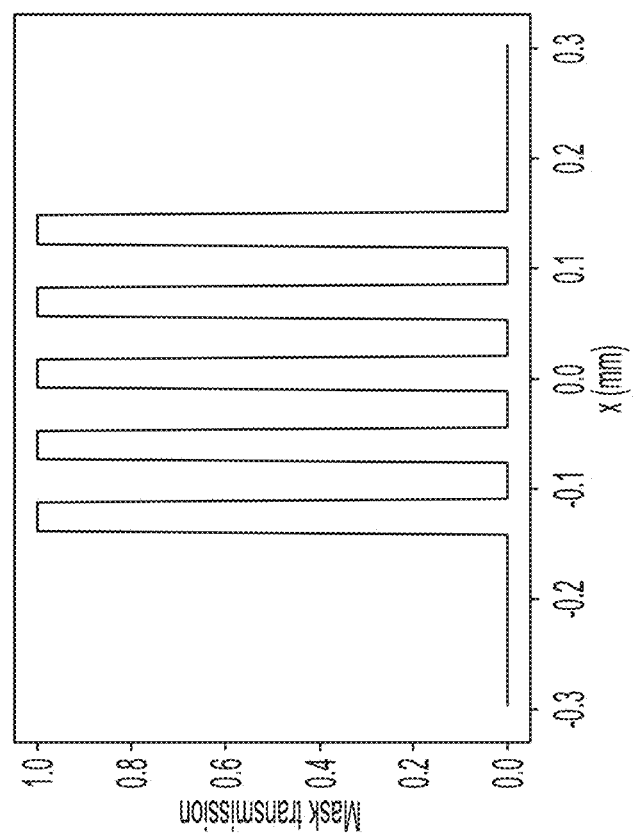
FIG. 4 is a graph of optical mask transmission (i.e., light transmission through the optical mask) as a function of distance along the jetting direction, in accordance with some embodiments of the present disclosure.
Figure 5:
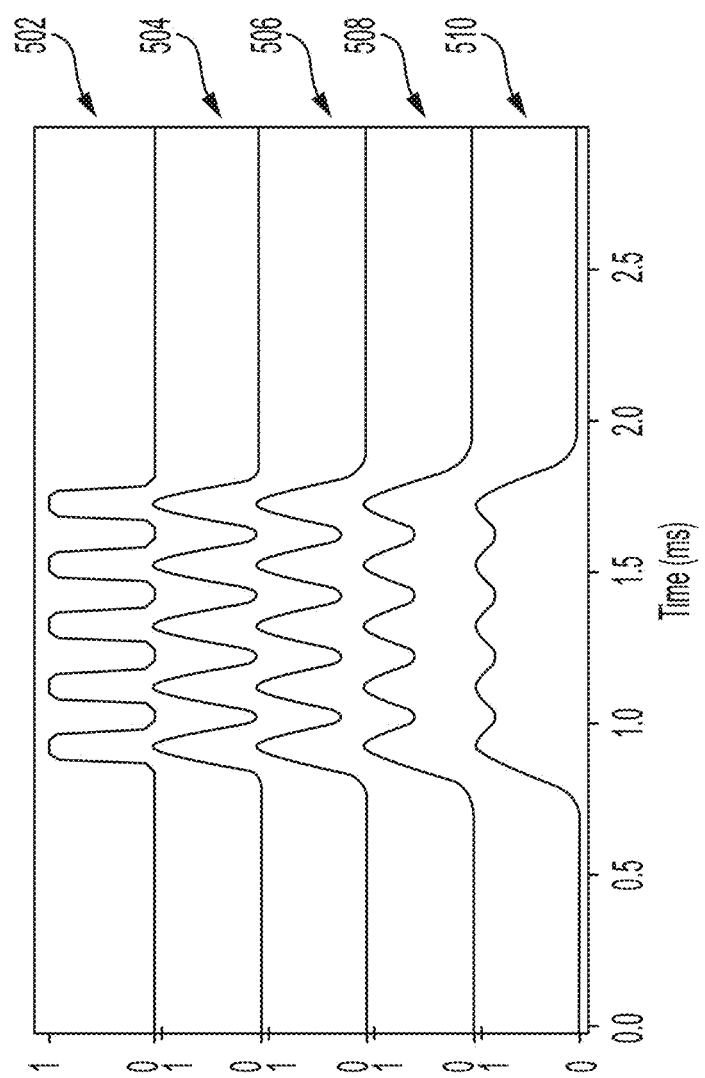
FIG. 5 is a graph of an example photodetector response based on the optical mask described in relation to FIGS. 3 and 4.
Figure 6:
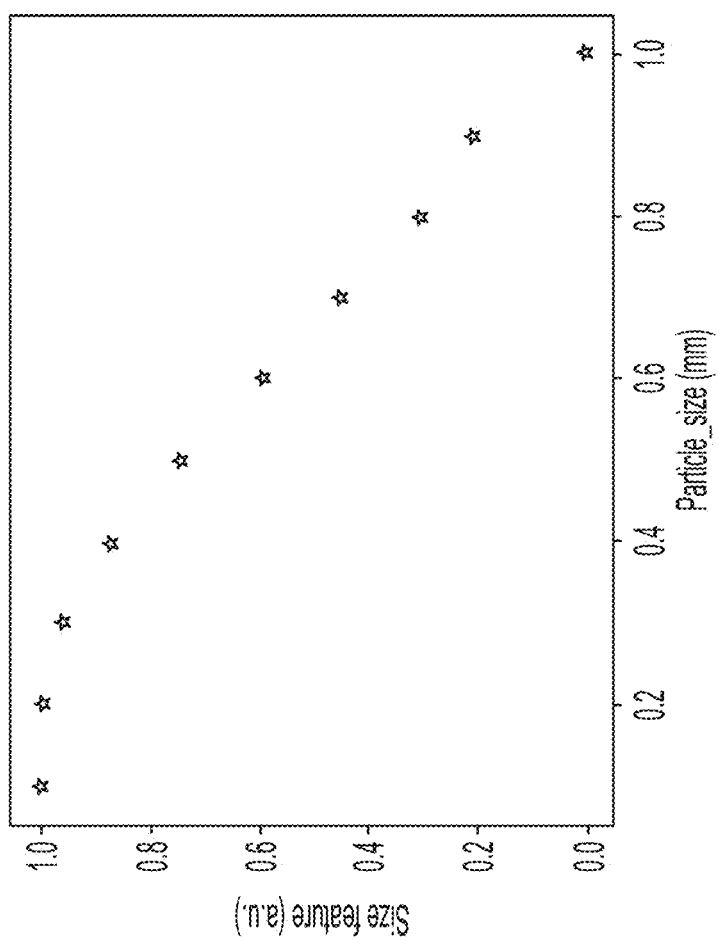
FIG. 6 is an example graph of amplitude variation versus droplet size based on the optical mask described in relation to FIGS. 3 and 4.

Regarding droplet size, it can be appreciated that the smaller droplet will sometimes be completely blocked by the opaque region, whereas the larger droplet will never be completely blocked by the opaque region regardless of its position. Accordingly, the smaller first droplet will tend to generate a signal with a larger amplitude variation as it travels behind the optical mask compared to the larger second droplet. Accordingly, this signal amplitude variation may serve as an indication of the droplet size. FIGS. 4-6 provide additional details regarding the detection of droplet sizes using the optical mask shown in FIG. 3.

FIG. 4 is a graph of optical mask transmission (i.e., light transmission through the optical mask) as a function of distance along the jetting direction in accordance with some embodiments of the present disclosure. As shown in FIG. 4, the amplitude of the light transmission is 1.0 (full transmission) for the transparent regions, and 0.0 (fully blocked) for the opaque regions. However, an optical mask in accordance with embodiments may have light transmissive regions (also referred to as light-passing regions) that are not fully transparent, and opaque regions (also referred to as light-blocking regions) that are not completely opaque. For example, the light passing regions may have a transmission value of 0.75, while the light-blocking regions may have a transmission value of 0.25. Additionally, the transmission value of the light transmissive regions may vary for different regions of the optical mask, and the transmission value of the light blocking regions may vary for different regions of the optical mask. Any suitable combination of transmission values may be used depending on the information to be encoded in the light signal.

FIG. 5 is graph of an example photodetector response based on the optical mask described in relation to FIGS. 3 and 4. Each graph shows a photodetector signal amplitude over time caused by a droplet of a given size passing behind the optical mask at a speed of approximately 3 mm/ms (millimeters per millisecond). The signal amplitudes shown in FIG. 5 are normalized values, which vary between a maximum value of one and a minimum value of zero. Graph 502 shows an example signal that would result from a steady stream of uniform droplets with a diameter of 0.1 mm. Graph 504 shows an example signal that would result from a steady stream of uniform droplets with a diameter of 0.3 mm. Graph 506 shows an example signal that would result from a steady stream of uniform droplets with a diameter of 0.5 mm. Graph 508 shows an example signal that would result from a steady stream of uniform droplets with a diameter of 0.7 mm. Graph 510 shows an example signal that would result from a steady stream of uniform droplets with a diameter of 0.9 mm.

From FIG. 5, it can be recognized that there a direct correlation between the size of the droplets and the amplitude variation of the signal. For the 0.1 mm droplets the amplitude varies from 0 to 1, which correlates with the fact that the droplet will alternate between being completely blocked (0) and completely visible (1). However, for the 0.9 mm droplets, the amplitude varies from approximately 0.9 to 1, which correlates with the fact that the light from the larger droplet is never completely blocked resulting in smaller amplitude variations.

FIG. 6 is an example graph of amplitude variation versus droplet size based on the optical mask described in relation to FIGS. 3 and 4. The data displayed in FIG. 6 may be derived from the data shown in FIG. 5. FIG. 6 demonstrates that there is a nearly linear relationship between droplet size and amplitude variation over a broad range of droplet sizes from about 0.3 mm to about 1.0 mm. Throughout this range, the approximate droplet size can be determined based on the amplitude variation in the received signal.

The effective droplet size range of the optical mask can be determined by the length (in the jetting direction) of the light-passing regions and the light blocking regions. For example, increasing the length of the light-passing regions and light-blocking regions will enable the optical mask to cover a different range of droplet sizes more effective for larger droplets. In some embodiments, two or more optical masks with different ranges of droplet size coverage may be deployed to cumulatively cover a broader range of droplet size than might be achievable with a single optical mask.

Figure 7:
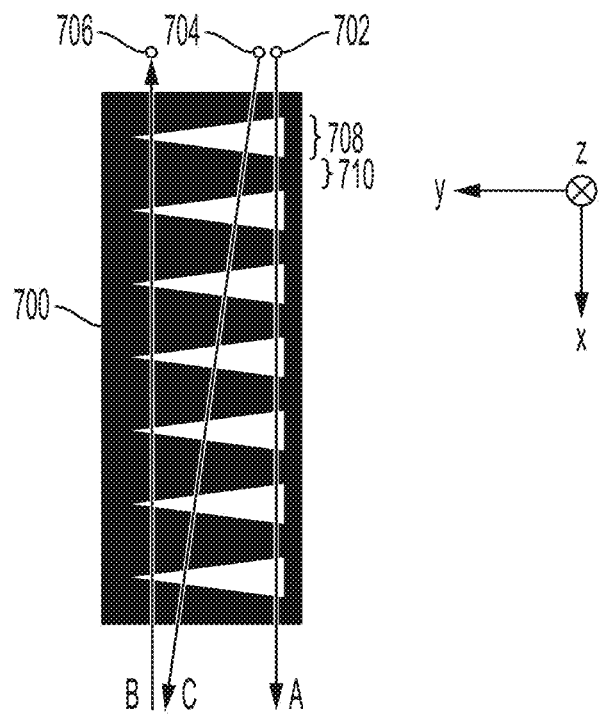
FIG. 7 illustrates an arrangement of an optical mask configured to encode trajectory information into an electrical signal in accordance with some embodiments of the present disclosure.

FIG. 7 illustrates an arrangement of an optical mask 700 configured to encode trajectory information into an electrical signal in accordance with some embodiments of the present disclosure. Potential droplet paths with different trajectories are depicted. Specifically, a first droplet 702 follows a path denoted path A, a second droplet 704 follows a path denoted path B, and a third droplet 706 follows a path denoted path C.

The optical mask 700 includes a series of transmissive regions 708 interleaved with non-transmissive regions 710. The transmissive regions 708 are triangular is shape such that the transmissive region is tapered in a direction orthogonal to the jetting directions (the positive Y direction in the depicted example). In this way, the proportion of transmissive to non-transmissive area gradually increases for greater values of Y. Accordingly, the signal generated by a droplet passing behind the optical mask will vary depending on its movement in the Y-axis as it moves along the jetting axis (X-axis).

Figure 8:
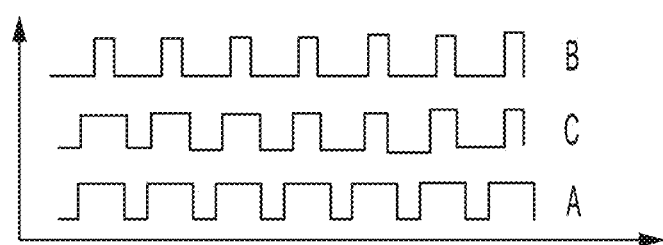
FIG. 8 illustrates examples of three time-varying electrical signals that may be obtained using the optical mask of FIG. 7.

FIG. 8 illustrates examples of three time-varying electrical signals that may be obtained using the optical mask of FIG. 7. The generated signals are denoted signal A (corresponding with path A of FIG. 7), signal B (corresponding with path B of FIG. 7) and signal C (corresponding with path C of FIG. 7). The time-varying signals have several characteristics that can be used to determination characteristics of the droplets 702, 704, and 706. For example, the frequency of each signal may be processed to identify the speed of the corresponding droplets in the X-direction.

Additionally, differences in the duty cycle of each signal may be used to determine a trajectory of the corresponding droplets in the Y-axis direction. As shown in FIG. 8, the signal A has a higher duty cycle because the path of the droplet coincides with a higher ratio of transmissive to non-transmissive area. By contrast, the signal B has a lower duty cycle because the path of the droplet coincides with a lower ratio of transmissive to non-transmissive area. Additionally, the duty cycle of signal C gradually increase over time. This indicates that the corresponding droplet 704 follows an angled trajectory such that the droplet moves in the positive Y-direction as it moves from the nozzle to the build platform. The rate of change of the duty cycle can indicate the angle of the corresponding droplet in the X-Y plane.

The optical mask described herein can provide partial information about the trajectory of a droplet. Specifically, it can be used to indicate the trajectory of the droplet in the X-Y plane, but may not provide any useful information about movement in the X-Z plane. In some embodiments, the 3D printer may be equipped with a second optical mask, similar or identical to the optical mask 700 but oriented in the X-Z plane and configured to encode trajectory information for the X-Z plane. The 3D printer would also have a corresponding second photodetector for receiving the light signal through the second optical mask. In this way, the complete three-dimensional trajectory of the droplets can be determined by processing the two signals.

The time-varying signals A, B, and C can also be processed to determine other features such as the size of the droplets, speed of the droplets, and uniformity or non-uniformity of the aforementioned features.

Figure 9:
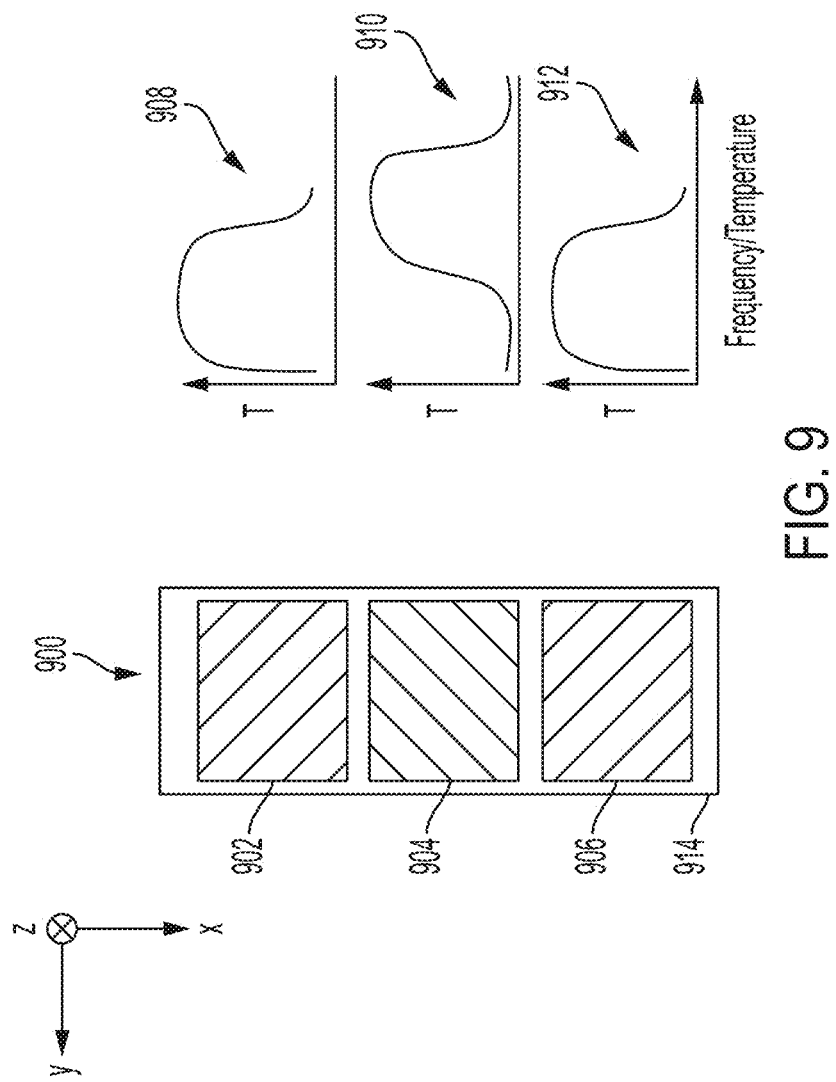
FIG. 9 is an example optical mask configured to encode temperature information in an electrical signal in accordance with some embodiments of the present disclosure.

FIG. 9 is an example optical mask 900 configured to encode temperature information in an electrical signal in accordance with some embodiments of the present disclosure. The optical mask in FIG. 9 includes three light transmissive regions, also referred to herein as windows 902 904 906, configured to be at least partially transparent to infrared light. The windows may be held together by a frame 914, which may be light-blocking with respect to infrared light. The IR light-blocking regions may be composed of a thin metal sheet, a thin high-temperature polymer sheet with an IR coating, a thin glass substrate with a metal coating, and other compositions.

The windows are also thermally selective, meaning that they exhibit different levels of light transmission for different frequencies of the infrared light, which is determined by the temperature of the droplets. The window's thermal response may be determined by the type and thickness of the window material. Various types of material or combinations of material may be used for the transmissive windows, including glasses made from or including Germanium, Zinc Selenide, Fused Silica, Calcium Fluoride, and AMTIR (Amorphous Material Transmitting Infrared Radiation) optical glass. The IR transmittance percentage of many such materials are known or can be tested. The transmittance will generally vary according to the IR wavelength and will be different for different materials. For example, some materials may be more transmissive for lower frequencies of IR light, while other materials may be more transmissive for higher frequencies of IR light. In some embodiments, a lens such as a calcium fluoride (CaF2) aspheric lens can be used to image the droplet onto the optical mask.

The windows may be configured exhibit different levels of IR light transmission for a given range of infrared frequencies. Such configuration can also be achieved via different optical coating on the substrate material. This enables the optical mask to modulate the light to encode information about the temperature of the drops. In the embodiment shown in FIG. 9, the first window 902 (closest to the nozzle) and the last window 906 (closest to the build platform) are made of a material that is more transmissive to lower frequency IR light, which is associated with colder temperatures. By comparison, the middle window 904 is made of a material that is more transmissive to higher frequency IR, which is associated with hotter temperatures. As an example, transmittance profiles of the first and last windows are shown as plots 908 and 912, and the transmittance profile of the middle window is shown as plot 910. It will be appreciated that the displayed profiles are only examples and that various profiles may be designed depending on the type and thickness of the materials used and any applied coatings.

As a droplet of molten metal passes behind the optical mask 900, the IR light emitted by the droplet and detected by the sensor will vary in intensity depending on its position behind the optical mask 900. In this way, the optical mask 900 can encode temperature information into the time-varying signal generated by the sensor. The sensor may be any suitable type of sensor capable of detecting infrared light, such as indium-gallium-arsenide (InGaAs) photodetectors. The example technique is further described in relation to the graphs of FIGS. 10A, 10B, and 11.

Figure 10A:
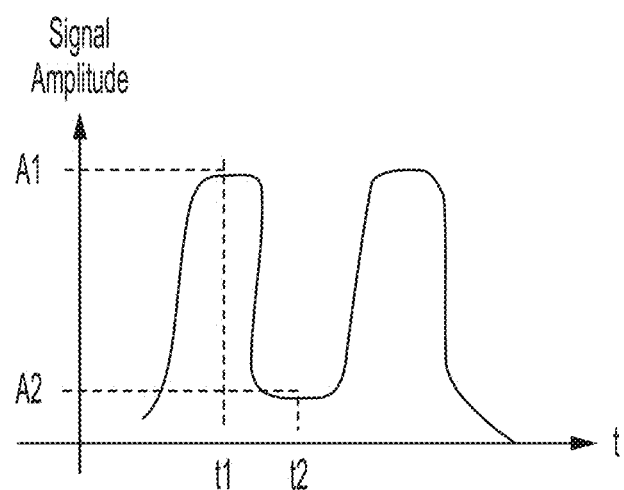
FIG. 10A shows an example of the time varying signal generated by a droplet passing next to the optical mask of FIG. 9.
Figure 10B:
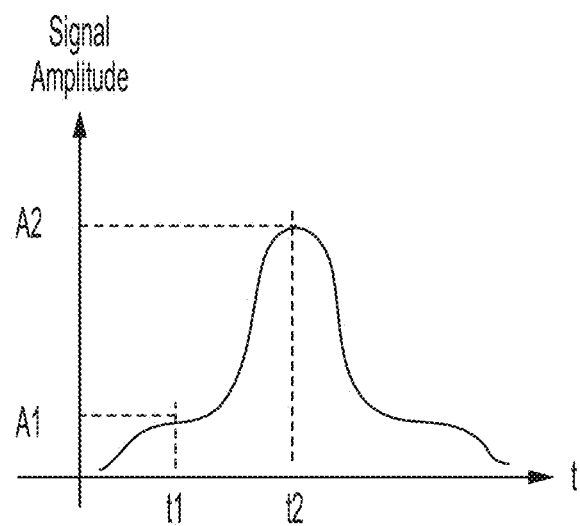
FIG. 10B shows another example of the time varying signal generated by a droplet passing next to the optical mask of FIG. 9.

FIG. 10A shows an example of the time varying signal generated by a droplet passing adjacent to the optical mask 900 of FIG. 9. FIG. 10A shows an example in which the droplet is relatively cold, such that the first window 902 and last window 906 are more transmissive at the IR frequency emitted by the droplet, and the middle window 904 is less transmissive at the IR frequency emitted by the droplet. This results in two peaks in the signal amplitude corresponding to the first window 902 and last window 906 and a minimum amplitude between the peaks, which is associated with the middle window 904. The first peak associated with the first window 902 has an amplitude A1 and occurs at time T1. The minimum associated with the middle window 904 has a value A2 and occurs at time T2. The ratio between these two amplitude values may be used to determine the temperature of the droplet, as explained further below in relation to FIG. 10B FIG. 10B shows another example of the time varying signal generated by a droplet passing next to the optical mask 900 of FIG. 9. FIG. 10B shows an example in which the droplet is relatively hot, such that the first window 902 and last window 906 are less transmissive at the IR frequency emitted by the droplet, and the middle window 904 is more transmissive at the IR frequency emitted by the droplet. This results in a single peak in the signal amplitude corresponding to the middle window 904 and two minimum amplitudes on each side of the peak associated with the first window 902 and last window 906. The first amplitude associated with the first window 902 has an amplitude A1 and occurs at time T1. The second amplitude associated with the middle window 904 has a value A2 and occurs at time T2. From FIGS. 10A and 10B it can be seen that the ratio of A1 and A2 will vary according to the temperature of the droplet and can therefore serve as an indication of the temperature of the droplet.

FIG. 11 is an example graph of the ratio of peak amplitudes versus temperature. The ratio A1/A2 is the ratio of two peaks caused by windows with different transmittance curves as function of temperature as described in relation to FIGS. 10A and 10B. A graph such as the graph shown in FIG. 11 may be used to associate the measured peaks of a detected signal with a temperature of molten metal droplets ejected by a 3D printer. The curve will vary depending on the relative admittance profiles of the windows 902 904 906.

In some embodiments, a 3D printer may be equipped with different optical masks configured to be respond differently to different temperature ranges. The optical masks may be arranged in any suitable manner that enables them to monitor the same stream of jetted material. For example, some optical masks may be positioned in series along the X-axis. In other embodiments, the optical masks may be oriented along different sides of the stream such that each optical mask monitors the stream from a different azimuthal angle. Each optical mask may be associated with a different sensor and may result in a different channel of information. The analyzer 208 (FIG. 2) may be configured to analyze multiple data channels to determine a temperature of the droplets.

Figure 12:
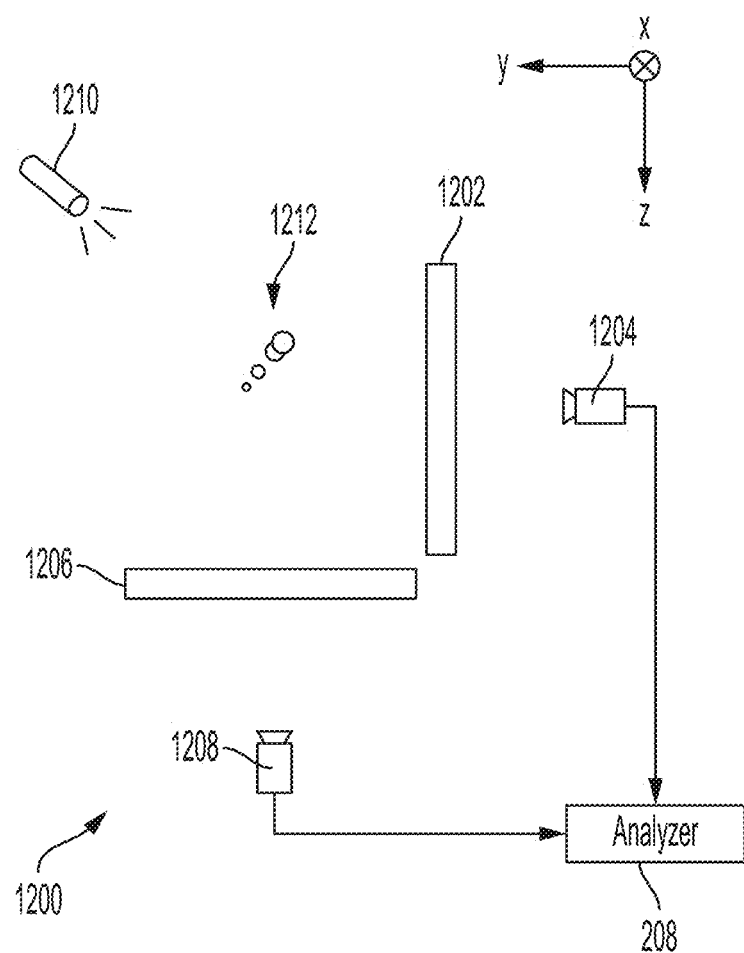
FIG. 12 is diagram of another system for determining droplet characteristics based on spatially modulated light, in accordance with some embodiments of the present disclosure.

FIG. 12 is diagram of another system 1200 for determining droplet characteristics based on spatially modulated light, in accordance with some embodiments of the present disclosure. The system 1200 may be incorporated into a 3D printer such as the 3D printer 100 of FIG. 1. In FIG. 12, the system 1200 is depicted from the top such that the jetting direction is into the page.

The system 1200 of FIG. 12 includes two optical masks, a first optical mask 1202 which is paired with photodetector 1204 and second optical mask 1206 which is paired with a photodetector 1208. The sensor data from both photodetectors 1204 1208 is collected by the analyzer 208.

The system 1200 also includes a light source 1210 to illuminate the stream of jetted material, e.g. droplets 1212. Although a single light source is shown, the system 1200 may include any suitable number of additional light sources. Also, the light source 1210 may be positioned at any location and in any orientation that provides suitable illumination of the droplets 1212. For example, one or more the light sources may be positioned above the stream adjacent to the nozzle as shown in FIG. 2.

The configuration of optical masks and sensors shown in FIG. 12 enable the collection of a richer dataset that reveals additional information about the stream of jetted material. Each optical mask may be configured to encode different information into the respective data streams, which may be referred to herein as different channels. For example, the first optical mask 1202 may be configured to be encode information for a first range of droplet sizes while the second optical mask encodes information for a second range of droplet sizes above or below the first range. In such embodiments, the first and second optical masks may be similar to the optical mask shown in FIG. 3 but with different lengths for the transparent and opaque regions.

In some embodiments, each channel may relate to a different type of information. For example, a first channel corresponding with photodetector 1204 may have temperature information encoded therein, while a second channel corresponding with photodetector 1208 may have size and/or speed information encoded therein.

In some embodiments, the optical masks 1202 and 1206 may be similar to the optical mask 700 of FIG. 7. In such embodiments, the optical mask 1202 may be configured to encode trajectory information related to movement of the droplets within the X-Z plane, and the optical mask 1206 may be configured to encode trajectory information related to movement of the droplets within the X-Y plane. By combining the trajectory information obtained for each plane, the complete 3-dimensional trajectory for the droplets may be determined.

In some embodiments, one or both sensors 1204 1208 may be IR sensors that can detect IR light emanating from the droplets. In this way, information about the droplets may be encoded in the signal using the IR light emanating from the droplets rather than an external light source. The features encoded into the signal using IR light may include any of the same features encoded using the external light, including droplet size, droplet speed, trajectory, and others. In some embodiments, the external light source 1210 may be activated at some times and deactivated at others. For example, the external light source 1210 may be activated if the temperature of the droplets is outside of a temperature range than can be effectively detected using the IR sensor, i.e., the droplets are too cold for example. If the droplet temperature rises to a level that the IR sensors can be used, then the light source 1210 may be deactivated in favor of the IR light from the droplets.

Additionally, one or both optical masks 1202 1206 may have thermally selective windows as described in relation to FIG. 9. In this way, information about the temperature of the droplets may be encoded into the signal, possibly in addition to the other information described such as droplet size, speed, or trajectory. In some embodiments, the optical mask 1202 may be configured for a first temperature range, and the optical mask 1206 may be configured for a second temperature range, above or below the first temperature range. In some embodiments, the temperature of the droplets may be known or may be measured using a separate sensing. Since oxide tend to exhibit higher emissivity compared to a metal of the same temperature, the known temperature and the emission intensity encoded into the electrical signal by the optical mask can be used to determine the oxidation status of the molten droplets. The system 1200 may use any suitable combination of masks to combine any of the encoding strategies described herein.

Figure 13:
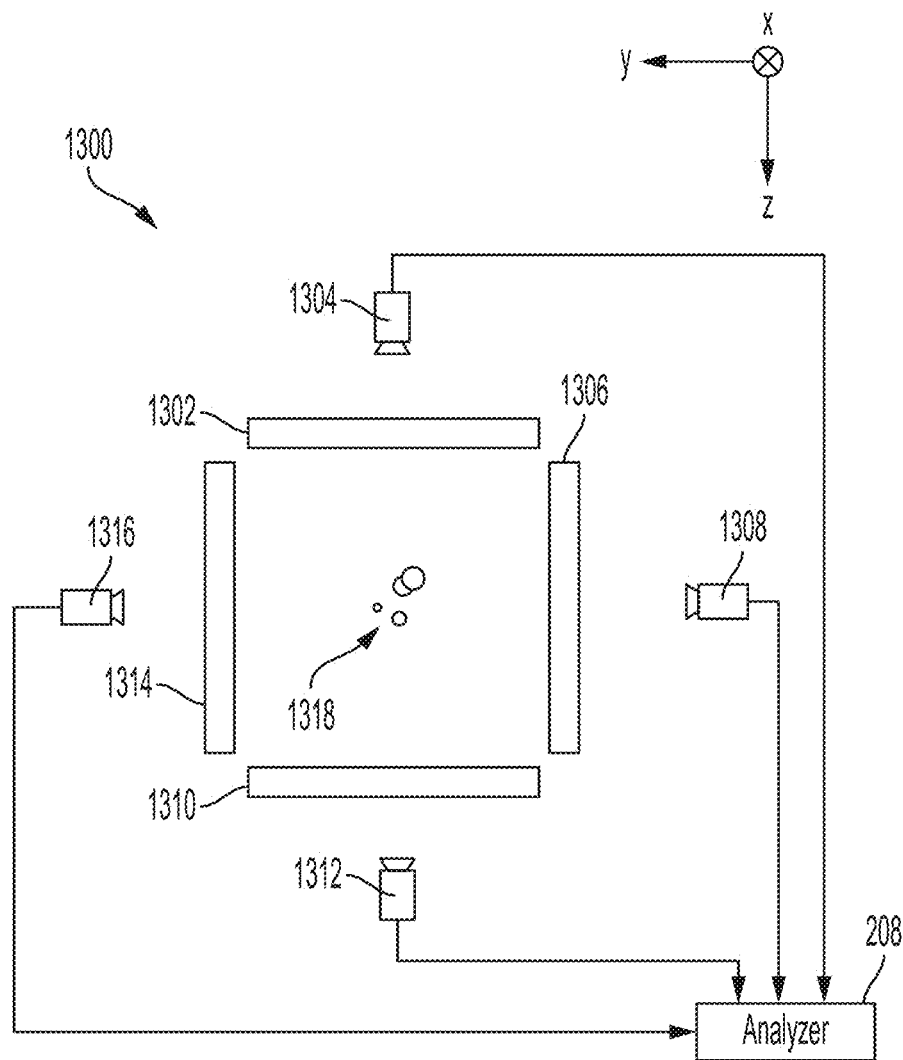
FIG. 13 is diagram of another system for determining droplet characteristics based on spatially modulated light, in accordance with some embodiments of the present disclosure.

FIG. 13 is diagram of another system 1300 for determining droplet characteristics based on spatially modulated light, in accordance with some embodiments of the present disclosure. The system 1300 may be incorporated into a 3D printer such as the 3D printer 100 of FIG. 1. In FIG. 13, the system 1300 is depicted from the top such that the jetting direction is into the page.

The system 1300 of FIG. 13 includes four optical masks arranged orthogonally around the jetting path. A first optical mask 1302 is paired with a first sensor 1304, a second optical mask 1306 is paired with a second sensor 1308, a third optical mask 1310 is paired with a third sensor 1312, and a fourth optical mask 1314 is paired with a fourth sensor 1316. All of the sensor data is collected by the analyzer 208.

The system 1300 may also include a light source (not shown) to illuminate the stream of jetted material, e.g. droplets 1318. For example, a light source may be positioned above the stream adjacent to the nozzle as shown in FIG. 2. In other embodiments, each of the sensors may be configured to detect IR light generated by the droplets themselves.

The optical masks may be configured to encode various types of information into their respective signals, e.g. channels. For example, optical mask 1302 and 1306 may be configured to encode a full three-dimensional trajectory of the droplets into their two respective signals, while optical mask 1310 and 1314 may be configured to encode two different channels of droplet size information. At the same time, each optical mask may also be configured to encode a different range of temperature information. Various combinations of optical mask types each with a different combination of capabilities may be included in the system. Additionally, a system in accordance with embodiments may include more than four optical masks. For example, optical masks may be stacked in the X-direction, or additional optical masks may be arranged around the jetting path.

Figure 14:
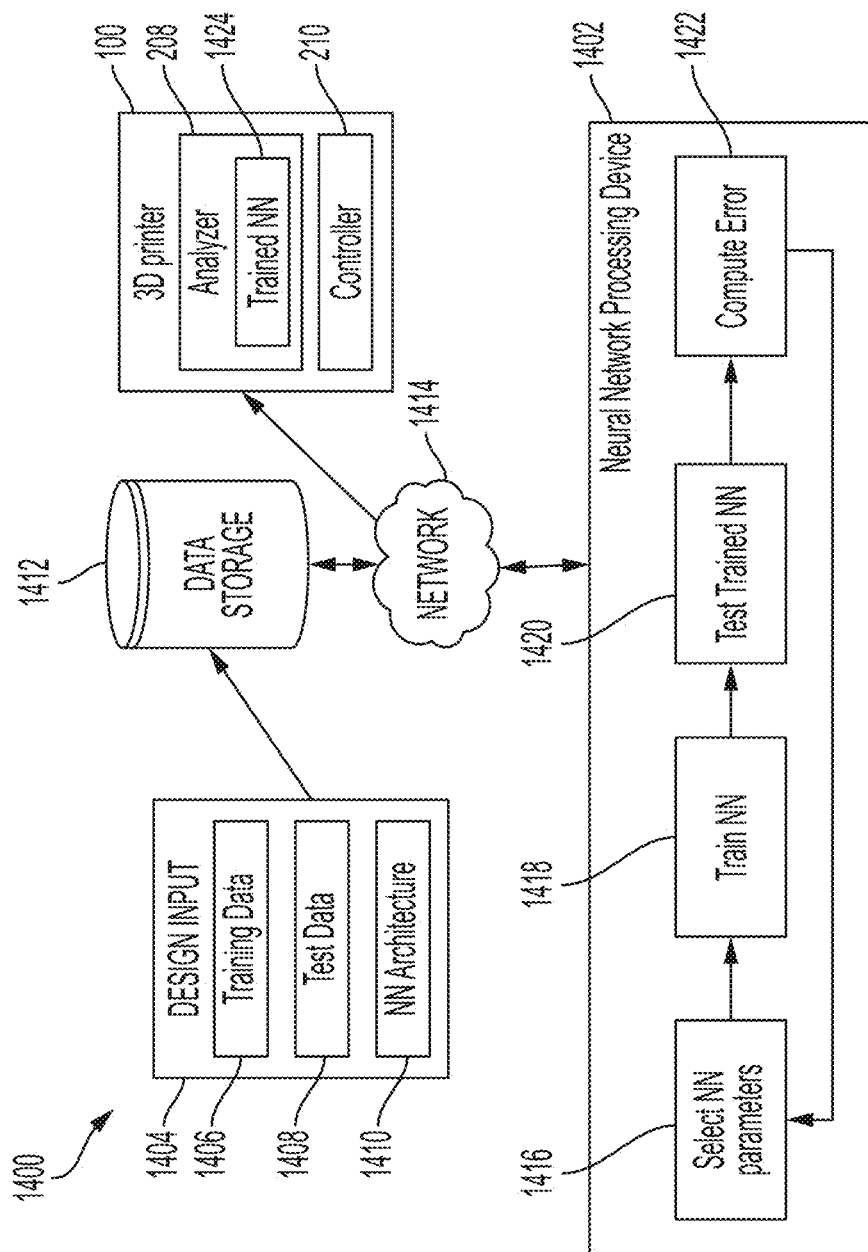
FIG. 14 is a block diagram of a neural network training system, in accordance with some embodiments of the present disclosure.

FIG. 14 is a block diagram of a neural network training system 1400, in accordance with some embodiments of the present disclosure. The system 1400 may be used to train a neural network to create a mapping between droplet characteristics and the time-varying electrical signal generated according to any of the embodiments described herein. Once the mapping is learned, the neural network can be used determine characteristics of the stream of jetted material, such as droplet size, speed, trajectory, and uniformity directly from the measured time-varying electrical signal. This may improve the speed of the real-time analysis of the stream of jetted material in 3D printing feasible, enabling rapid closed-loop feedback control of the 3D printing process.

The neural network may be trained by a neural network processing device 1402 in accordance with design input 1404. The design input can include training data 1406, test data 1408, and neural network architecture data 1410.

The system 1400 can include the 3D printer 100, which is used to generate the training data 1406 and test data 1408 for training the neural network. The 3D printer 100 may be connected to a data storage device 1412 through a network 1414. The data storage device 1412 may store various types of data such as the training data 1406, and the test data 1408, which can be accessed by the neural network processing device 1402. The 3D printer 100 may be an LMJ printer, or other type of 3D printer that ejects liquid droplets.

The training data 1406 and the test data 1408 both include pairs of input data and corresponding output data. In some embodiments, the input data may be the time-varying electrical signal (i.e., time domain representation) generated by the photodetectors 140 (FIG. 2). As described above, the time-varying electrical signal includes data encoded into the signal by one or more optical masks (e.g., 202, 300, 700, 900). In some embodiments, the input data may be a feature of the time-varying electrical signal such as a frequency domain representation of the time-varying electrical signal. The input data may be referred to herein as a training signal.

The output data may include one or more droplet characteristics such as the droplet size, droplet speed, droplet uniformity, and others. The droplet characteristics may be determined based on images of the stream of jetted material obtained, for example, through high-speed video camera imaging of the droplets. The images may be obtained by performing image capture in relation to an actual print job run by the 3D printer 100 or a similar 3D printer during which time-varying electrical signal is also collected to be used as the corresponding input data. The time-varying electrical signals may be labeled to indicate the droplet characteristics included in the image. The labels may be attached to the input data manually based on visual inspection of the images. The training data can include any suitable number of input training samples and corresponding output training samples, and the test data can include a suitable number of input test samples and corresponding output test samples.

The neural network architecture data 1410 dictates the type of neural network and can also describe the adjustable features of the neural network, e.g., the model's hyperparameters, a suitable range of values for each of the hyperparameters, and an amount by which the hyperparameters can be adjusted.

To generate the neural network, the processing device 1402 may first select values for the hyperparameters of the neural network at block 1416. The hyperparameters may be any parameters that affect the structure of the neural network, such as the number of hidden layers and the number of neurons in each hidden layer, or determine how the neural network is trained, such as the learning rate and batch size, among others.

At block 1418, the neural network is trained using the selected hyperparameter values and the training data 1406. Training the neural network means computing the values of the neural network's weights and biases to minimize a cost function. Any suitable cost function may be used. The neural network is fed input training samples, and the cost function consists of terms that can be calculated based on a comparison of the neural network's output and the corresponding output training samples. The neural network may be a feedforward neural network trained using a technique or a feed forward technique and using any suitable training algorithm, including backpropagation, a gradient descent algorithm, and/or a mini-batch technique. The neural network may also be a recurrent neural network, convolutional neural network, a non-linear autoregressive model, and others.

When the neural network is finished training, the trained neural network can be tested at block 1420 by feeding a number of input test samples from the test data 1408 and comparing the neural network's outputs with the corresponding output test samples. An error value may be computed for each test sample. At block 1422, the distribution of test sample errors or any derived properties like its mode or mean may be computed.

If the test error metric exceeds a specified threshold, the training process may return to block 1416, wherein a new set of hyperparameter values is selected and/or the training data selection is updated. The adjusted neural network can then be trained at block 1418, tested at block 1420, and an appropriate test error metric for the trained neural network can be computed. The process may be repeated until the resulting test error metric is below the threshold, or the process may be repeated a specified number of times to provide an adequate sampling of the hyperparameter space, with the trained neural network producing the smallest test error metric selected as the final trained neural network 1424. The trained neural network 1424 may be stored and used by the analyzer 208 to identify droplet characteristics using the time-varying electrical signal (or its corresponding frequency-domain representation) as input to the trained neural network 1424.

In some embodiments, the trained neural network 1424 may be applicable to a specific type of printer, for example, a specific brand and/or specific 3D printer version. In such cases, the trained neural network 1424 may be broadly applicable to a type of 3D printer or a combination of a specific type of 3D printer and a specific type of printing material. Accordingly, the training data 1406 and test data 1408 may be obtained by experimentation and the training process performed by the manufacturer. The trained neural network 1424 can then be incorporated in the software and/or firmware of the 3D printer provided to users.

It will be appreciated that various alterations may be made to the system 1400 and that some components may be omitted or added without departing from the scope of the disclosure.

Figure 15:
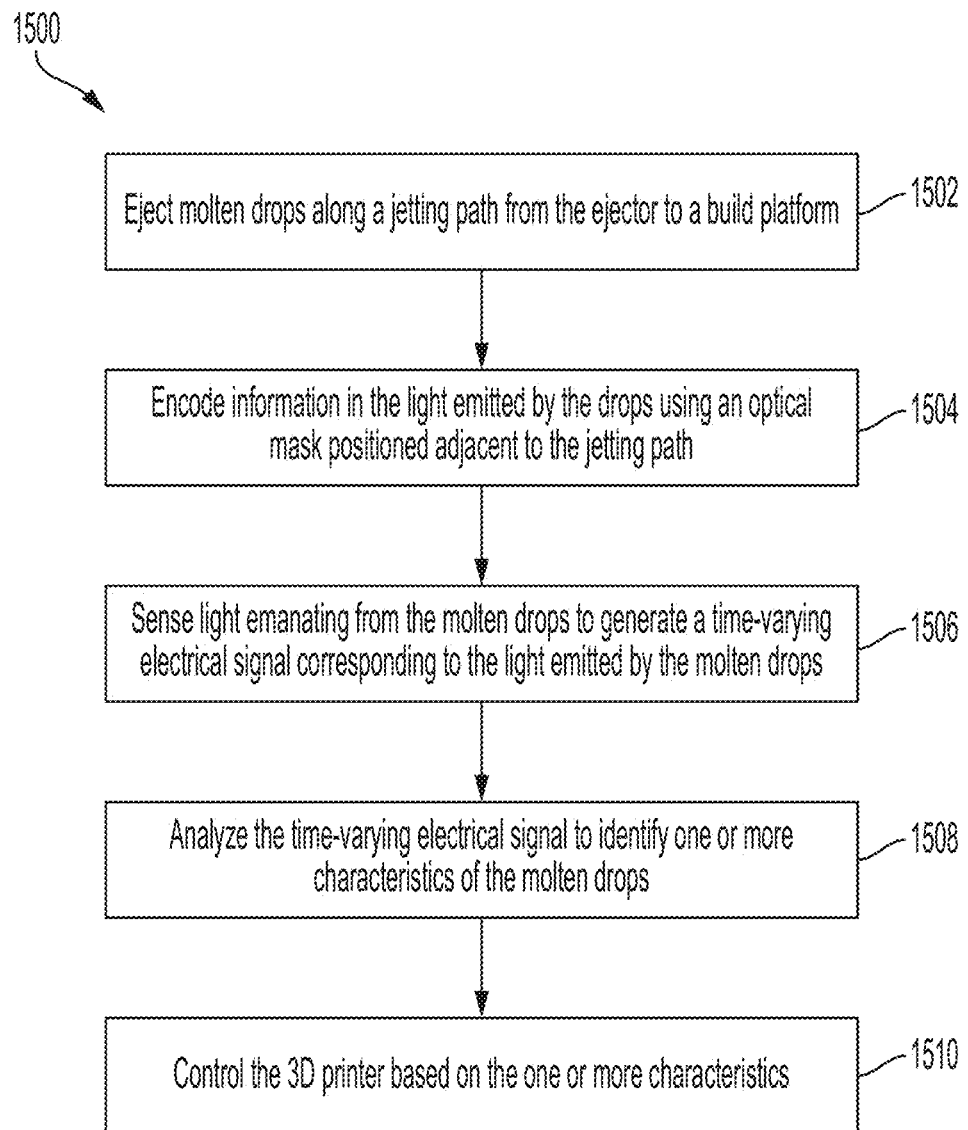
FIG. 15 is a process flow diagram of a method of identifying features of a stream of jetted material used to build a 3D object, in accordance with embodiments of the present disclosure

FIG. 15 is a process flow diagram of a method of identifying features of a stream of jetted material used to build a 3D object, in accordance with embodiments of the present disclosure. Aspects of the method may be performed by a 3D printer and/or computing device such as the 3D printer 100 and computing system 190 shown in FIG. 1. The method may begin at block 1502.

At block 1502, stream of molten droplets is ejected along a jetting path from the ejector to a build platform of the 3D printer. The molten droplets travel past one or more optical masks positioned adjacent to the jetting path. In some embodiments, the jetting path may be illuminated by one or more external light sources. The molten droplets may be any suitable printing material including any suitable metal or polymer, for example.

At block 1504, information is encoded in the light emitted by the droplets by the one or more optical masks positioned adjacent to the jetting path. Each optical mask may be positioned between the jetting path and corresponding light sensor or between the light source and the jetting path. In embodiments with more than one optical mask, each optical mask may be paired with a separate sensor as described, for example, in relation to FIGS. 12 and 13. The optical masks may include any of the optical masks descried herein or combinations thereof. The optical masks may be configured to encode any useful type of information including droplet size, speed, temperature, trajectory, and uniformity, among other.

At block 1506, the light emanating from the droplets is sensed to generate a time-varying electrical signal corresponding to the light emanating from the molten droplets. As used herein, the phrase "light emanating from the droplets" includes light reflected, refracted, scattered, or otherwise redirected by the droplets from an external light source, as well as light radiated by the droplets themselves such as infrared light generated as a consequence of the heat of the droplets. The light may be sensed using any type of light sensor, including photodetectors such as photodiodes, photoresistors, phototransistors, InGaAs photodetectors, and others. The sensor may be a single pixel detector and does not generate an image of the droplets. Rather, the sensor generates a time varying-electrical signal, e.g., a voltage or current level that changes over time.

At block 1508, the time-varying electrical signal is analyzed by a processing device to identify one or more characteristics of the molten droplets. The analysis of the time-varying signal may include transforming the time-varying electrical signal into a frequency domain representation using, for example, a Fourier transform such as the Fast Fourier Transform (FFT). Analysis of the time-varying electrical signal extracts the information encoded by the optical mask and is dependent on the design of the optical mask as described above. The analysis may be performed according to any suitable technique including any of the techniques described herein. In some embodiments, the analysis is performed by inputting the one or more time-varying electrical signals (or a frequency domain representation thereof) into a trained neural network (e.g., trained neural network 1424) that maps features of the electrical signals to droplet characteristics.

The extracted characteristics may include any one or a combination of droplet size, speed, and trajectory, among others. The characteristics may also include a metric that relates to the uniformity between the several droplets of the stream of jetted material, including uniformity of size, speed, trajectory, etc. The uniformity metric may be computed using a formula that incorporates any combination of the extracted characteristics, such as the number of frequency components in the electrical signal, the number of different trajectories detected, and/or the number of different droplet sizes detected for example. In embodiments with optical masks that are thermally selective, the characteristics may also include the temperature and/or an oxidation state of the droplets.

At block 1510, the 3D printer can be controlled based on the identified characteristics of the droplets. Controlling the 3D printer may involve controlling aspects of the 3D printing process. For example, with reference to FIG. 1, the power provided to the heating elements 130 may be adjusted to increase or decrease the temperature of the droplets, or the step function DC voltage profile (e.g., voltage pulses) provided to the coils 134 may be adjusted to increase or decrease the pressure at the inlet of the nozzle 114 of the ejector 110. In some cases, controlling the 3D printer may involve terminating the print job.

In some embodiments, controlling the 3D printer may involve controlling a display included as a component of the 3D printer or communicatively coupled to the 3D printer. For example, with reference to FIG. 1, the display screen 192 associated with the computing system 190 may be used to display various information about the detected droplet characteristics, such as droplet size, speed, temperature, etc. The controller may also display a metric related to the quality of the stream of jetted material. For example, a quality score may be computed based one or more droplet characteristics and displayed to the user. In some embodiments the information may be displayed using a symbolic or pictorial representation. For example, a simulated illustration of the stream of jetted material may be generated based on the droplet characteristics and displayed on the display screen.

Controlling the 3D printer may also involve generating and displaying message related to the droplet characteristics. For example, the message may alert the operator that the 3D printing conditions are deteriorating or have become unfavorable. Based on the information displayed, the operator may be able to adjust the 3D printer manually or can manually terminate the 3D printing process.

The process described in relation to FIG. 15 may be repeated continuously throughout the print job. Various operations are described as multiple discrete operations, in turn, in a manner that is most helpful in understanding the present disclosure. However, the order of description may not be construed to imply that these operations are necessarily order dependent. In particular, the operations shown in FIG. 15 need not be performed in the order of presentation.

Figure 16:
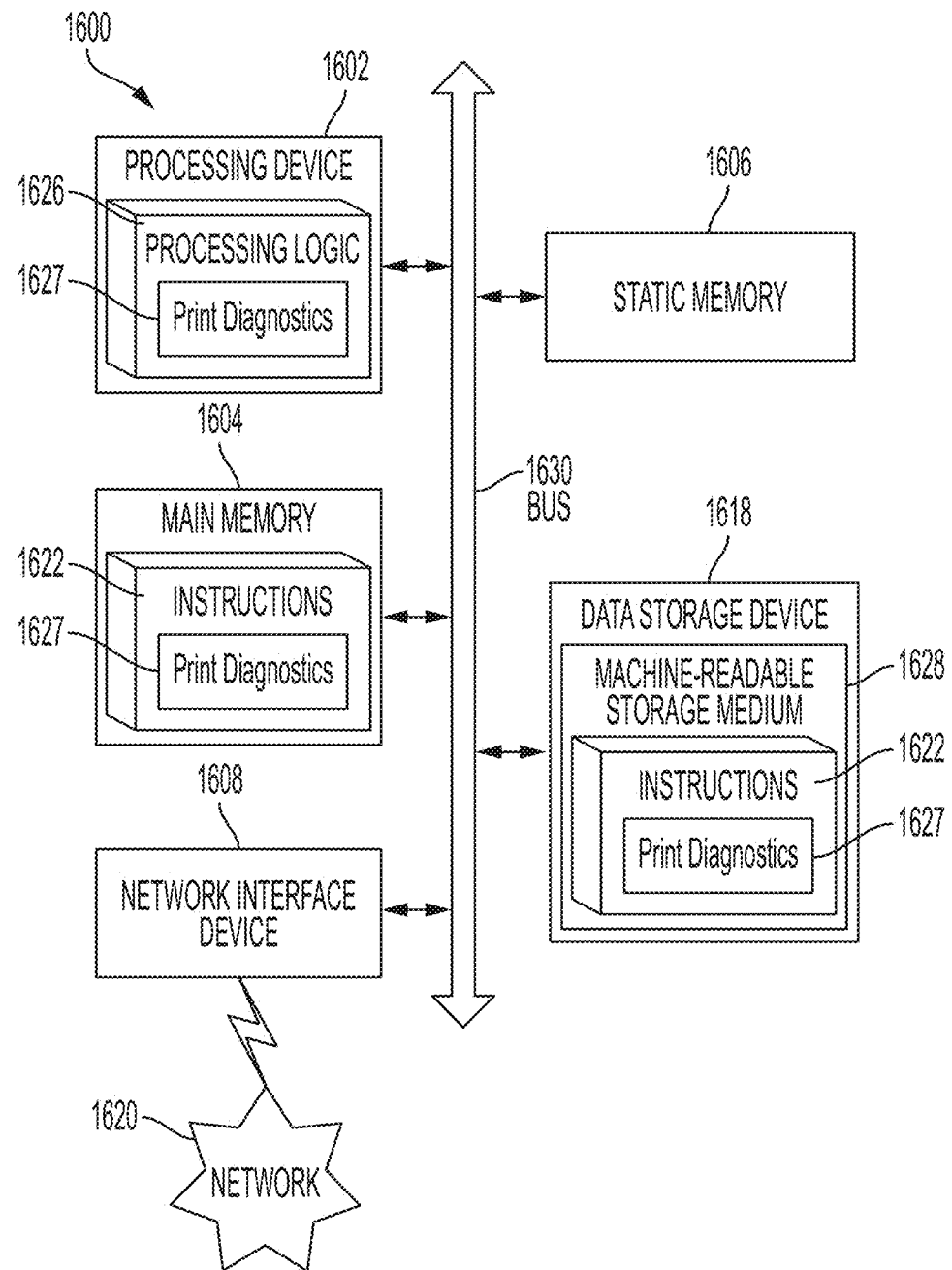
FIG. 16 illustrates an example computational system for performing operations of assessing jetting quality of a 3D printer, in accordance with embodiments of the present disclosure.

FIG. 16 illustrates a diagrammatic representation of a machine in the example form of a computer system 1600 within which a set of instructions 1622, for causing the machine to perform any one or more of the methodologies discussed herein, may be executed. In various embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a web appliance, a server, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processing device 1602, a main memory 1604 (e.g., read-only memory (ROM), flash memory, dynamic random access memory (DRAM), a static memory 1606 (e.g., flash memory, static random access memory (SRAM), etc.), and a data storage device 1618, which communicate with each other via a bus 1630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. The processing device 1602 may execute processing logic 1626 for performing the operations and steps discussed herein.

The data storage device 1618 may include a machine-readable storage medium 1628, on which is stored one or more set of instructions 1622 (e.g., software). The instructions may include a print diagnostics software 1627 embodying any one or more of the methodologies of functions described herein, including automatically identifying droplet characteristics during a 3D print job, controlling a 3D printer responsive to the droplet characteristics, etc. The instructions 1622 may also reside, completely or at least partially, within the main memory 1604 or within the processing device 1602 during execution thereof by the computer system 1600; the main memory 1604 and the processing device 1602 also constituting machine-readable storage media. The instructions 1622 may further be transmitted or received over a network 1620 via the network interface device 1608.

The non-transitory machine-readable storage medium 1628 may also be used to store instructions to perform the methods and operations described herein. While the machine-readable storage medium 1628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A three-dimensional (3D) printer, comprising:
   an ejector configured to release molten droplets along a jetting path from the ejector to a build platform;
   a sensor positioned adjacent to the jetting path and configured to generate an electrical signal in response to light emanating from the molten droplets;
   an optical mask positioned adjacent to the jetting path, the optical mask comprising a plurality of regions configured to modulate the electrical signal generated by the sensor as the molten droplets travel along the jetting path;
   one or more processing devices to:
     receive the electrical signal;
     analyze the electrical signal to identify one or more characteristics of the molten droplets; and
     control the 3D printer based on the one or more characteristics.

2. The 3D printer of claim 1, wherein to analyze the electrical signal comprises to:
   identify a frequency component of the electrical signal; and
   identify the one or more characteristics of the molten droplets based on the frequency component, wherein the one or more characteristics comprises a travel speed of at least one of the one or more molten droplets.

3. The 3D printer of claim 1, wherein to analyze the electrical signal comprises to:
   identify amplitude variations in the electrical signal; and
   identify the one or more characteristics of the molten droplets based on the amplitude variations, wherein the one or more characteristics comprises a size of at least one of the one or more molten droplets.

4. The 3D printer of claim 1, wherein to analyze the electrical signal comprises to generate a regularity metric describing a degree of regularity of the molten droplets.

5. The 3D printer of claim 1, wherein to analyze the electrical signal comprises to identify a presence of satellites among the molten droplets.

6. The 3D printer of claim 1, wherein to analyze the electrical signal comprises to:
   identify a duty cycle of the electrical signal; and
   identify the one or more characteristics of the molten droplets based on the duty cycle, wherein the one or more characteristics comprises a trajectory of at least one of the one or more molten droplets.

7. The 3D printer of claim 1, wherein to analyze the electrical signal comprises to convert the electrical signal to a frequency domain representation.

8. The 3D printer of claim 1, wherein to analyze the electrical signal comprises to:
   input the electrical signal or a feature of the electrical signal into a trained neural network; and receive an output of the trained neural network, wherein the output comprises the one or more characteristics of the molten droplets.

9. The 3D printer of claim 8, wherein the trained neural network is trained using a training signal labeled to indicate a corresponding droplet characteristic indicated by the training signal and obtained via high-speed imaging.

10. The 3D printer of claim 1, wherein the sensor is a first sensor, the electrical signal is a first electrical signal, and the optical mask is a first optical mask, and wherein the 3D printer further comprises:
    a second sensor positioned adjacent to the jetting path; and
    a second optical mask configured to modulate a second electrical signal generated by the second sensor as the molten droplets travel along the jetting path, wherein the one or more processing devices are to analyze the second electrical signal to identify one or more additional characteristics of the molten droplets.

11. A method of sensing characteristics of a stream of jetted material in a 3D printer, the method comprising:
    ejecting molten droplets along a jetting path from an ejector to a build platform;
    sensing light emanating from the molten droplets to generate an electrical signal corresponding to the light emitted by the molten droplets;
    encoding information in the light emanating from the molten droplets using an optical mask positioned adjacent to the jetting path, wherein the optical mask comprises a plurality of regions comprising light-blocking regions and light-passing regions configured to modulate the signal as the molten droplets travel along the jetting path;
    analyzing, by a processing device, the electrical signal to identify one or more characteristics of the molten droplets; and
    controlling the 3D printer based on the one or more characteristics.

12. The method of claim 11, wherein analyzing the electrical signal comprises:
    identifying a frequency component of the electrical signal; and
    identifying the one or more characteristics of the molten droplets based on the frequency component, wherein the one or more characteristics comprises a travel speed of at least one of the one or more molten droplets.

13. The method of claim 11, wherein analyzing the electrical signal comprises:
    identifying amplitude variations in the electrical signal; and
    identifying the one or more characteristics of the molten droplets based on the amplitude variations, wherein the one or more characteristics comprises a size of at least one of the one or more molten droplets.

14. The method of claim 11, wherein analyzing the electrical signal comprises generating a regularity metric describing a degree of regularity of the molten droplets.

15. The method of claim 11, wherein analyzing the electrical signal comprises identifying a presence of satellites among the molten droplets.

16. The method of claim 11, wherein analyzing the electrical signal comprises:
    identifying a duty cycle of the electrical signal; and
    identifying the one or more characteristics of the molten droplets based on the duty cycle, wherein the one or more characteristics comprises a trajectory of at least one of the one or more molten droplets.

17. The method of claim 11, wherein analyzing the electrical signal comprises:
    inputting the electrical signal or a feature of the electrical signal into a trained neural network; and
    receiving an output of the trained neural network, wherein the output comprises the one or more characteristics of the molten droplets, wherein the trained neural network is trained using a training signal labeled to indicate a corresponding droplet characteristic indicated by the training signal.

18. A non-transitory computer-readable storage medium having instructions stored thereon that, when executed by a processing device, cause the processing device to:
    receive an electrical signal generated by a sensor positioned adjacent to a jetting path of a 3D printer, wherein the electrical signal is generated in response to light emanating from molten droplets as they pass adjacent to an optical mask positioned adjacent to the jetting path;
    analyze the electrical signal to identify one or more characteristics of the molten droplets encoded into the electrical signal by the optical mask; and
    control the 3D printer based on the one or more characteristics.

19. The non-transitory computer-readable storage medium of claim 18, wherein to analyze the electrical signal comprises to:
    identify a frequency component of the electrical signal and amplitude variations in the electrical signal;
    identify a travel speed of at least one of the one or more molten droplets based on the frequency component; and
    identify a size of at least one of the one or more molten droplets based on the amplitude variations.

20. The non-transitory computer-readable storage medium of claim 18, wherein to analyze the electrical signal comprises to:
    identify a duty cycle of the electrical signal; and
    identify a trajectory of at least one of the one or more molten droplets based on the duty cycle.

* * * * *